July 6, 1948.                S. G. ISSERSTEDT                2,444,568
                        ELECTRONIC CONTROL CIRCUIT
                           Filed March 26, 1943
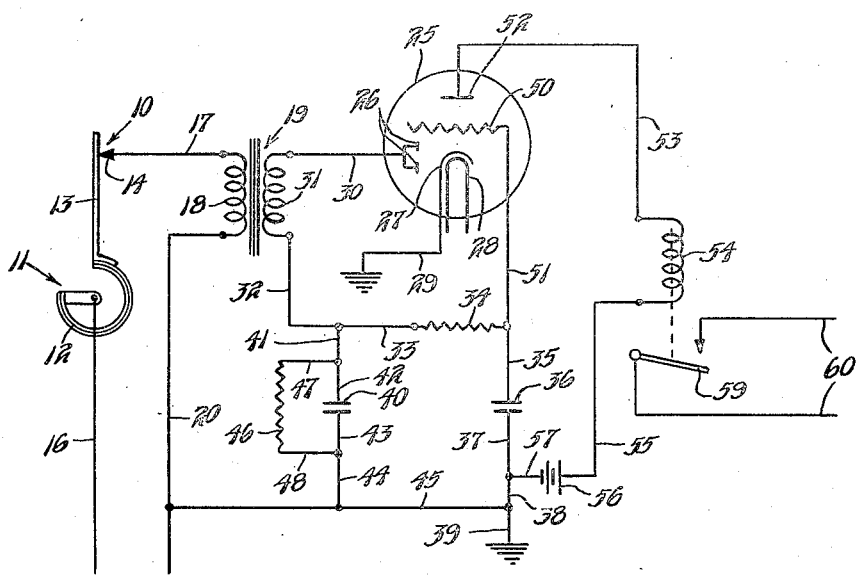
Inventor
SIEGFRIED G. ISSERSTEDT
By
George H. Fisher
Attorney Patented July 6, 1948

2,444,568

UNITED STATES PATENT OFFICE 2,444,568

ELECTRONIC CONTROL CIRCUIT

Siegfried G. Isserstedt, Toronto, Ontario, Canada, assignor to Minneapolis-Honeywell Regulator Company, Minneapolis, Minn., a corporation of Delaware Application March 26, 1943, Serial No. 480,678

5 Claims. (Cl. 250—27)

The present invention is directed broadly to an electrical control circuit and is more particularly directed to a circuit which is provided with a means for overcoming the effect of a chattering contact in the main control switch. Such an arrangement is particularly adapted for use in combination with a circuit which is placed under the control of a relatively delicate condition responsive element which is located in a place where it is likely to be subject to vibrations causing the element to rapidly open and close the circuit.

The principal object of the present invention is to provide a control circuit which will cause or prevent the flow of current to a control device depending upon the relationship between the periods during which the control switch is closed and the periods during which the control switch is open. Thus if the control switch is chattering but is closed say for slightly more than fifty percent of the time, then the control circuit may operate to prevent the flow of current to the control device, whereas if the chattering contact is open more than half the time then the circuit may cause the flow of current to the control device.

Another object of the invention is to accomplish the above results through the medium of a condenser which may be charged while current is flowing through the main control switch and discharged at such time that current is not flowing through the main control switch, and utilizing an electric discharge device, such as a triode, having a control grid which is biased in accordance with the charge on the condenser for controlling the flow of current through the plate circuit in which the control device is located.

Where the main switch is located in an A. C. circuit, it is contemplated that this circuit shall be coupled with the condenser and electric discharge device through a transformer and that some form of rectifying device shall be provided for rectifying the induced A. C. current for the purpose of charging the condenser.

An additional object of the invention is to provide a second condenser for opposing the discharge of the first condenser and to provide additional resistance means for timing the charging and discharging rate of the first condenser.

These and other objects will readily become apparent as the following specification is read in the light of the accompanying drawing, the single figure of which diagrammatically illustrates one form which my invention may take.

Referring now to the drawing, the main control switch 10 is actuated by means of a condition responsive element indicated at 11. Although this condition responsive element may take any one of many various forms, and may respond to any one of many various conditions such as temperature, pressure, humidity, liquid level, rate of flow, etc., for the purposes of illustration it has been indicated as a bimetallic element 12 which is fixed at one end and which carries the contact blade 13 at its opposite end and is so arranged that on an increase in temperature it will move the contact blade 13 into engagement with the stationary contact 14, the blade 13 and contact 14 forming the elements of the main control switch 10. The main control switch 10 is adapted to control the flow of current from an alternating current source, not shown, through the conductor 16, bimetallic element 12, contact blade 13, contact 14, conductor 17, primary winding 18 of the transformer 19, and conductor 20 back to the source of supply.

An electric discharge device is shown in the form of the vacuum tube 25 which is commonly referred to as a duo-diode-triode. The two diodes take the form of the two plates 26 which cooperate with the cathode 27, this cathode being heated by means of the electric heater 28 which is connected to some suitable source of power, not shown. The cathode 27 is grounded by means of a conductor 29. The two plates 26 are connected by means of the conductor 30 to one end of the secondary winding 31 of the transformer 19. The other end of the secondary winding 31 is connected by means of the conductors 32 and 33, resistance element 34, and conductor 35 to one plate of a condenser 36. The other plate of the condenser is connected by means of the conductors 37, 38 and 39 to ground. A second condenser 40 is connected to the junction between the two conductors 32 and 33 by means of the conductors 41 and 42, and also to ground by means of conductors 43, 44, 45 and 39. The resistance 46 is connected in parallel with the condenser 40 by means of the two conductors 47 and 48.

The condenser 36 is connected to the control grid 50 of the triode portion of the tube 25 by means of conductors 35 and 51. The plate 52 of the triode is connected by means of conductor 53 to some electroresponsive device such as the relay winding 54, which is in turn connected by the conductor 55 to the positive side of the battery 56, the negative side of which is grounded by means of the conductors 57, 38 and 39. It is immaterial as far as the present invention is concerned what the relay winding 54 controls, but for the purposes of illustration it is shown as controlling the switch arm 59 which is in control of a control circuit indicated at 60.

When the temperature at the thermostat 12 is below its control setting, it will contract and move the switch blade 13 out of engagement with the stationary contact 14, or in other words the switch 10 will be open. At this time, therefore, there will be no current flowing in the primary winding 18 of the transformer 19 and hence no current flowing in the secondary winding 31. Under such conditions, both the cathode 27 and the control grid 50 of the triode will be at ground potential, and as the battery 56 is applying a plate voltage, the tube will conduct current from the battery 56 through conductor 55, relay winding 54, conductor 53, plate 52, to the cathode 27 and thence to ground. This circuit will energize the relay 54 which will close the switch 59 thus energizing the controlled circuit 60.

Upon an increase in temperature the thermostat 12 will expand and move the switch arm 13 into engagement with the stationary contact 14, thereby applying an alternating current voltage to the primary winding 18 of the transformer 19. This will in turn induce an alternating current in the secondary winding 31 and the two diodes formed by the plates 26 and the cathode 27 will act to produce a half wave rectification of this alternating voltage. In other words, when the two plates 26 are at a positive potential with respect to the cathode 27, electrons which leave the cathode will pass through the plates 26 and thence through conductor 30, transformer winding 31, conductors 32 and 33, resistance 34, and conductor 35 to bring the upper plate of the condenser 36 to a negative potential with respect to the lower plate which is connected by means of conductors 37, 38, and 39 to ground. The electrons will also pass through conductor 32 and thence through conductors 41 and 42 to the upper plate of the condenser 40 to charge this condenser in the same manner. The resistance 34 will retard the flow of current to the condenser 36 and therefore this condenser will charge up more slowly than the condenser 40. It will also be apparent that the charges on the two condensers 40 and 36 will oppose each other, or in other words, during the half cycle when the plates 26 of the diodes are at the same potential as the cathodes 27 and there is no current flowing through the transformer winding 31, then the condenser 40 will oppose the discharge of the condenser 36. The condenser 40 will discharge through the resistance 46 but its rate of discharge will be retarded by this resistance. On the next succeeding half wave when current is again flowing through the transformer winding 31, the condenser 36 will be further charged. It will be noted that the upper plate of the condenser 36 is connected by means of conductors 39 and 51 to the grid 50 of the triode and therefore the potential of the grid 50 with respect to the potential of the cathode 27 will become more and more negative as the condenser 36 is charged. Eventually, this negative bias on the grid 50 will be sufficient to prevent further flow of current from the cathode 27 to the plate 52 and therefore the relay winding 54 will be deenergized and the switch 59 opened.

When the temperature at the thermostat 12 decreases it will again open the switch 10 and no more current will flow through the transformer winding 31. At this time, the condenser 36 will discharge through conductor 35, resistance 34, conductors 33, 41 and 47, resistor 46, and conductors 48, 44, 45 and 39 to ground. This permits the grid 50 of the triode to again attain the same potential as the cathode 27 and the triode will again pass current and energize the winding 54.

As stated in the objects of the invention, this system was designed for use in combination with a very sensitive condition responsive element and one which may be subject vibrations thus causing the blade 13 to chatter with respect to contact 14. The sizes of the two condensers 40 and 36 as well as the two resistances 34 and 46 may be so chosen that where the switch blade 13 is chattering the condenser 36 can only be charged sufficiently to produce a negative bias on the grid 50 to prevent the passage of current through the tube when the switch blade 13 is in engagement with the contact 14 a certain percentage of the time. Thus, these values may be so chosen that the switch blade 13 must be in engagement with contact 14 for approximately fifty per cent of the time before the condenser 36 is charged sufficiently to prevent the flow of current through the relay winding 54. Then upon a decrease in temperature at the bimetallic blade 12, the switch blade 13 will be moved slightly away from the contact 14 to the point where it is in engagement with contact 14 something less than fifty per cent of the time, and under these circumstances the condenser 36 may be permitted to discharge sufficiently to reduce the bias on the grid 50 and again permit the triode to pass current and energize the relay winding 54. Therefore, although the controlled switch blade 13 may chatter badly, the system is so designed as to produce a steady and reliable operation of the control relay 54. The fifty per cent relationship mentioned above is given for the purposes of illustration only, and any other percentage may be obtained merely by varying the values of the two condensers 36 and 40 and the two resistances 34 and 46.

Various changes and modifications of the present invention may occur to those skilled in the art and I therefore desire it to be understood that I intend to be limited only by the scope of the appended claims and not by the specific embodiment of the invention disclosed herein.

I claim as my invention:

1. In a device of the class described, in combination, a first continuously energized electric circuit, switching means operative to interrupt and complete said circuit, temperature responsive means adapted to bias said switching means into circuit interrupting and circuit completing positions, said switching means being sensitive to vibration, whereby said bias may erratically be overcome, a control circuit, and electronic integrating means regulating the energization of said control circuit in accordance with the ratio between the continuously integrated durations of intervals of interruption and those of completion of said first circuit by said switching means.

2. In a device of the class described, in combination, a first continuously energized electric circuit, switching means operative to interrupt and complete said circuit, temperature responsive means comprising a bimetallic strip adapted to bias said switching means into circuit interrupting and circuit completing positions, said switching means being sensitive to vibration, whereby said bias may erratically be overcome, a control circuit, and electronic integrating means regulating the energization of said control circuit in accordance with the ratio between the continuously integrated durations of intervals of interruption and those of completion of said first circuit by said switching means.

3. In a device of the class described, in combination, a thermostat constructed to function as a single-pole single-throw switch, said thermostat being sensitive to vibration to erratically influence said switching function, a first continuously energized circuit including said thermostat, a second circuit, coupling means electrically associating said circuits, and switching means controlled by said second circuit, said coupling means including electronic integrating means energizing said switching means in accordance with the ratio between the continuously integrated durations of intervals of interruption and those of completion of said first circuit by said thermostat.

4. In a device of the class described, in combination, a device to be energized, a switch for controlling the energization of said device and comprising two relatively movable switch contacts, means responsive to a normally slowly changing condition for moving one of said contacts into or out of engagement with the other contact as the condition slowly changes with respect to a predetermined value, said condition responsive means being affected by physical vibrations to cause erratic engagement and disengagement of said contacts when said condition is assuming a value close to said predetermined value, and electronic integrating means controlling the energization of said device in accordance with the ratio between the continuously integrated durations of intervals of separation of said contacts and those of closure of said contacts.

5. In a device of the class described, in combination, a device to be energized, a switch for controlling the energization of said device and comprising two relatively movable switch contacts, means responsive to a normally slowly changing condition for moving one of said contacts into or out of engagement with the other contact as the condition slowly changes with respect to a predetermined value, said condition responsive means being affected by physical vibrations to cause erratic engagement and disengagement of said contacts when said condition is assuming a value close to said predetermined value, and means controlling the energization of said device in accordance with the ratio between the continuously integrated durations of intervals of separation of said contacts and those of closure of said contacts, said last named means comprising an electronic discharge device having a control element and controlling the energization of said device, means including a condenser for applying a control voltage to said control element, and means for causing said condenser to charge slowly while said contacts are closed and to discharge slowly while said contacts are open.

SIEGFRIED G. ISSERSTEDT.

REFERENCES CITED

The following references are of record in the file of this patent:

UNITED STATES PATENTS

| Number | Name | Date |
|---|---|---|
| 1,634,979 | Carter | July 5, 1927 |
| 2,208,349 | Ulbricht | July 16, 1940 |
| 2,217,478 | Gulliksen | Oct. 8, 1940 |
| 2,222,172 | Dimmick | Nov. 19, 1940 |
| 2,292,846 | Pritchard | Aug. 11, 1942 |
| 2,341,351 | Barkley | Feb. 8, 1944 |

FOREIGN PATENTS

| Number | Country | Date |
|---|---|---|
| 261,384 | Great Britain | Oct. 6, 1927 |